(12) United States Patent
Tock et al.

(10) Patent No.: US 11,038,759 B2
(45) Date of Patent: Jun. 15, 2021

(54) SYSTEM, APPARATUS AND METHOD FOR DYNAMICALLY UPDATING THE CONFIGURATION OF A NETWORK DEVICE

(71) Applicant: Proofpoint, Inc., Sunnyvale, CA (US)

(72) Inventors: Theron D. Tock, Mountain View, CA (US); Vadim Kurland, Los Gatos, CA (US); Michael P. Horn, San Carlos, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 16/397,616

(22) Filed: Apr. 29, 2019

(65) Prior Publication Data

US 2019/0253322 A1    Aug. 15, 2019

Related U.S. Application Data

(63) Continuation of application No. 13/746,975, filed on Jan. 22, 2013, now Pat. No. 10,277,465.

(51) Int. Cl.
  *H04L 12/24*    (2006.01)
(52) U.S. Cl.
  CPC ...... *H04L 41/0893* (2013.01); *H04L 41/0816* (2013.01)
(58) Field of Classification Search
  CPC .................. H04L 41/0893; H04L 41/0816
  See application file for complete search history.

(56) References Cited

U.S. PATENT DOCUMENTS

| 6,243,749 | B1 * | 6/2001 | Sitaraman | ......... H04L 29/12066 |
| | | | | 709/220 |
| 7,516,174 | B1 | 4/2009 | Tashjian et al. | |
| 7,603,374 | B2 * | 10/2009 | Cameron | ................ G06F 16/86 |
| 10,277,265 | B2 | 4/2019 | Tock et al. | |
| 2003/0020977 | A1 | 1/2003 | Smith et al. | |
| 2005/0054326 | A1 | 3/2005 | Rogers | |
| 2005/0213560 | A1 | 9/2005 | Duvvury | |

(Continued)

OTHER PUBLICATIONS

International Search Report issued for International Application No. PCT/US14/11142 dated Jun. 6, 2014, 4 pages.

(Continued)

*Primary Examiner* — Sm A Rahman
(74) *Attorney, Agent, or Firm* — Sprinkle IP Law Group

(57) ABSTRACT

A system, apparatus and method are provided for dynamically updating a configuration of a network device when relevant sources and destinations of network traffic are added, removed or migrated in a network. A configuration of a network device is associated with a set of network addresses representing a set of relevant sources and destinations of network traffic. The set is dynamic in that the membership of the set can change over time to include different network addresses as the set of relevant sources and destinations of network traffic changes over time. One or more data sources are monitored to obtain the network addresses for the set of relevant sources and destinations and to determine if the membership of the set has changed. When a change is detected, the configuration of the network device is updated on the network device to reflect the network addresses that are currently in the set.

20 Claims, 4 Drawing Sheets

(56) References Cited

U.S. PATENT DOCUMENTS

| | | | |
|---|---|---|---|
| 2007/0271372 A1* | 11/2007 | Deninger | H04L 63/12 709/224 |
| 2008/0259922 A1 | 10/2008 | White et al. | |
| 2009/0204699 A1 | 8/2009 | Kortright | |
| 2010/0099405 A1* | 4/2010 | Brisebois | H04L 41/0893 455/434 |
| 2010/0146148 A1 | 6/2010 | Schwimer | |
| 2010/0198955 A1 | 8/2010 | Maruyama et al. | |
| 2013/0114394 A1* | 5/2013 | Hu | H04L 43/103 370/216 |
| 2014/0207917 A1 | 7/2014 | Tock et al. | |
| 2014/0279808 A1* | 9/2014 | Strassner | G06Q 10/10 706/47 |

OTHER PUBLICATIONS

Written Opinion issued for International Application No. PCT/US14/11142, dated Jun. 6, 2014, 12 pages.
Office Action issued for U.S. Appl. No. 13/746,975, dated Jul. 1, 2015, 16 pages.
Office Action issued for U.S. Appl. No. 13/746,975, dated May 10, 2016, 20 pages.
Office Action issued for U.S. Appl. No. 13/746,975, dated Jan. 13, 2017, 14 pages.
Office Action issued for U.S. Appl. No. 13/746,975, dated Nov. 2, 2017, 15 pages.
Supplementary European Search Report issued for EP Application No. EP 14 74 2980, 6 pages.
Peter N.M. Hansteen, "Firewalling with Open BSD's PF Packet Filter," retreived from <<http://home.nuug.no/~peter/pf/en/long-firewall.html>>, 26 pages, Jan. 2, 2013.
Diomidis Spinellis, "Another Level of Indirection, Beautiful Code: Leading Programmers Explain How They Think," vol. 3, Chapter 7, pp. 279-291, Jan. 1, 2007.
Notice of Allowance issued for U.S. Appl. No. 13/746,975, dated May 31, 2018, 8 pages.
Corrected Notice of Allowability issued for U.S. Appl. No. 13/746,975, dated Jun. 22, 2018, 5 pages.

* cited by examiner

SYSTEM, APPARATUS AND METHOD FOR DYNAMICALLY UPDATING THE CONFIGURATION OF A NETWORK DEVICE

CROSS-REFERENCE TO RELATED APPLICATION(S)

This is a continuation of, and claims a benefit of priority from, U.S. patent application Ser. No. 13/746,975, filed Jan. 22, 2013, entitled "SYSTEM, APPARATUS AND METHOD FOR DYNAMICALLY UPDATING THE CONFIGURATION OF A NETWORK DEVICE," which is fully incorporated by reference herein for all purposes.

TECHNICAL FIELD

This invention relates generally to administration of network devices and more specifically to updating the configurations of network devices automatically when relevant sources and destinations of network traffic are added, removed or migrated in a network.

BACKGROUND OF THE RELATED ART

Network devices including firewalls, routers, load balancers, intrusion detection systems or intrusion prevention systems (IDS/IPSes), web application firewalls (WAFs) and network address translators (NATs) can be employed to control network traffic. Such network devices can, for example, be configured to block certain network traffic, allow certain network traffic, modify certain network traffic (e.g., removing or disarming malware in a payload of a HTTP packet, etc.), route certain network traffic, and allocate bandwidth for certain network traffic. Such devices, which can control network traffic, are also commonly referred to as policy enforcement points (PEPs).

Such a network device is configured in a manner and format that is compatible with the network device. Accordingly, the specific commands or data used to configure a network device may vary among the various network devices according to the requirements of each network device. Such network devices, however, are typically configured with a set of device-specific rules that indicate how various network traffics that are encountered are to be handled. Such a rule typically provides a criteria for identifying certain network traffic and an action to be performed when network traffic satisfying the criteria is encountered. The criteria is typically specified in terms of one or more sources, destinations and/or service types (e.g., ICMP, HTTP, SMTP, etc.) of network traffic, and the action to be taken is generally one of allowing, blocking, modifying, routing, allocating bandwidth, or another action that can be applied to network traffic as is known to one skilled in the art. Each source or destination of the network traffic is typically specified using a network address such as an Internet Protocol (IP) address, media access control (MAC) address, or another network address format as is known to one skilled in the art.

Conventionally, a network administrator logs into a network device and configures the network device by specifying one or more device-specific rules. In expressing the rules, network devices generally allow a source or destination of network traffic to be identified using explicit network addresses (e.g., such as IP address 10.10.10.10). For example, a rule such as "allow 10.10.10.10" may be specified for a firewall to configure the firewall to allow traffic to or from a computer having network address 10.10.10.10 to pass through the firewall. Additionally, network devices commonly provide a convenience mechanism that allows a network administrator to create an object to reference one or more explicit network addresses which can then be used in rules in place of the explicit network addresses. For example, a network administrator may first specify an object named white_list to refer to IP addresses 10.10.10.10 and 10.10.10.20 and then specify a rule such as "allow white_list" to allow traffic to and from computers having network addresses referenced in the white_list to pass through the firewall.

Such objects are referred to as "object groups" on Cisco firewall products, as "address sets" on Juniper firewall products, and by other names on other network devices as is known to one skilled in the art. Such objects used in network devices are referred to herein as device-specific objects.

In addition to specifying device-specific rules that can be applied to all traffic to or from a particular network address, device-specific rules may also be specified more specifically so that a device-specific rule applies only to traffic originating from certain sources and/or destinations. For example, a rule such as "allow source_list destination_list" may be specified for a firewall to configure the firewall to allow any traffic originating from any network address listed in the source_list device-specific object to any network address listed in the destination_list device-specific object to pass through the firewall. As is known to one skilled in the art, device-specific rules can take a variety of forms on the various network devices and may be expressed using multiple device-specific objects.

Conventionally, once a network device is configured with device-specific objects and device-specific rules, such objects and rules remain static (i.e., unchanged) until the network device is reconfigured by a network administrator. For example, if a firewall is configured with a white_list device-specific object and the firewall is further configured to allow only traffic to and from the network addresses listed in the white_list to pass through the firewall, a network administrator will have to log into the firewall and update the set of network addresses referenced by the white_list device-specific object each time the administrator wants to allow additional traffic or eliminate certain traffic from passing through the firewall.

In the past, such static nature of device-specific objects and device-specific rules was not a major issue since the set of sources and destinations of network traffic that an administrator needed to be concerned with changed infrequently. But in recent years, with greater utilization of virtual machines and cloud services, the set of sources and destinations of network traffic that an administrator needs to be concerned with has started to change with greater frequency and irregularity. With virtual machines and cloud services, sources and destinations of network traffic can be easily, quickly or unexpectedly added, removed or migrated (such as from one virtual or physical machine to another). Accordingly, the set of sources and destinations of network traffic that a network administer needs to be concerned with has become more dynamic in recent years and has increased the burden on network administrators to re-configure network devices to keep pace with a frequently changing set of sources and destinations of network traffic.

As an example, by utilizing a cloud service such as Amazon Web Services (AWS) to host game servers, a game company can conveniently and quickly provision additional game servers or remove existing game servers from AWS as user demand for its game services changes throughout the course of a day or a week. But if those game servers need to access user data in a database server that is protected by a firewall, a network administrator will need to reconfigure the firewall each time a new game server is added in A WS so that network traffic to and from the new server will be allowed to pass through the firewall. Such a burden placed on the network administrator could be bypassed by configuring the firewall initially to accept network traffic indiscriminately from a range of IP addresses that could be assigned to new game servers by A WS. But configuring a firewall to allow network traffic from a greater range of IP addresses than is minimally required renders the resources being protected by the firewall more vulnerable to security threats.

In another example, if a firewall is to be configured to allow only network traffic to and from computers being utilized by authorized users to pass through the firewall, the firewall will need to be reconfigured each time an authorized user utilizes a new computer or each time the computer being utilized by an authorized user takes on a new network address. In recent years, however, with the introduction of a greater variety of mobile computing devices, a user can now access numerous computing devices in a course of a day and computing devices can frequently change network addresses as computing devices are moved from one location to another. In today's dynamic computing environment, requiring a network administrator to reconfigure the firewall each time an authorized user utilizes a different computing device or each time the computer being utilized by the authorized user takes on a new network address would be extremely burdensome.

Accordingly, what is needed is a way to reconfigure network devices automatically when relevant sources and destinations of network traffic are added, removed or migrated in a network.

BRIEF SUMMARY OF THE DISCLOSURE

A system, apparatus and method are provided for dynamically updating the configurations of network devices when relevant sources and destinations of network traffic are added, removed or migrated in a network.

In an embodiment, a configuration of a network device, such as a device-specific object, is associated with a set of zero or more network addresses representing relevant sources and destinations of network traffic. The set is dynamic in that the membership of the set can change over time to include different network addresses as relevant sources and destinations of network traffic are added, removed or migrated in a network. At least one data source is monitored to obtain automatically the network addresses of the relevant sources and destinations and to determine automatically if the membership of the set has changed. When a change is detected in the membership of the set, the associated configuration of the network device is updated automatically on the network device to reflect the network addresses that are currently in the set. Accordingly, the configuration of the network device is updated to reflect a dynamic set of sources and destinations of network traffic.

In an embodiment, a dynamic object or a group object, which can include one or more dynamic, static or other group objects (as further explained in the detailed description section below), is created to hold the set of network addresses representing the relevant sources and destinations of network traffic.

In creating a dynamic object, a query to a data source is specified and stored with the dynamic object. Optionally, a filter is specified and associated with a query. A query is formatted (such as by a network administrator) in a manner that is compatible with the data source for obtaining from the data source a set of zero or more network addresses representing sources and destinations of network traffic that are relevant for configuring a network device. A filter, if specified, is formatted (such as by a network administrator) in a manner that IS compatible with a result returned by the query to further identify from the result a set of relevant network addresses. Once the query is specified, the query along with any associated filter is applied to information available to the data source to obtain an initial set of network addresses and is assigned to the dynamic object. Thereafter, the query along with any associated filter is subsequently re-applied to the data source periodically or when the data source indicates that new information about sources and destinations of network traffic is available. When a subsequent application of the query and any associated filter returns a new result that is different from what is held by the dynamic object, the new result is stored as the value of the dynamic object and the value of the dynamic object is identified as having changed. Additionally, any group object that includes the dynamic object is also identified as having a changed value.

In an embodiment, an identifier for a configuration of the network device is stored and associated with one or more dynamic, static or group objects. For example, a name of a device specific object of the network device may be stored and associated with one or more dynamic, static or group objects. When a change to the value of the dynamic object or group object is detected, the configuration on the network device is updated to reflect the new value of the associated dynamic object or group object.

In an embodiment, a configuration, such as a device-specific object, of a network device is updated by communicating with the network device and providing the network device with at least one command to cause the network device to assign to the configuration the value of the associated dynamic object or group object. In an embodiment, if an empty value is to be assigned to a configuration of the network device, a reserved network address is instead assigned to the configuration of the network device.

DETAILED DESCRIPTION

Figure 1:
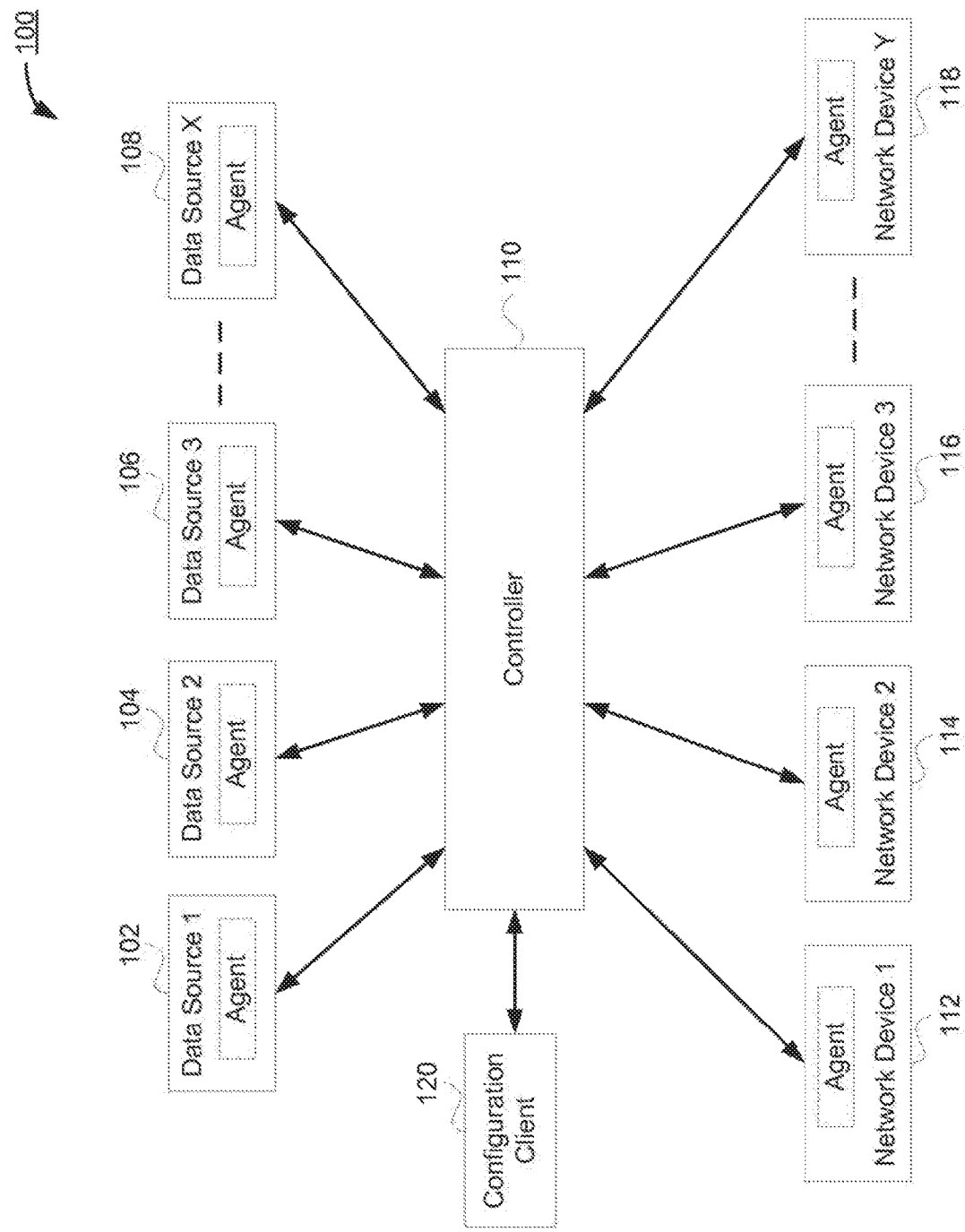
FIG. 1 is a block diagram of an exemplary system in accordance with the invention.

A system, apparatus and method are further described below for dynamically updating the configurations of network devices when relevant sources and destinations of network traffic are added, removed or migrated in a network.

Information about available sources and destinations of network traffic in a network are accessible from numerous data sources. For example, a domain name system (DNS) server can be a data source from which one or more network addresses of a computer can be obtained by providing the DNS server with the hostname of the computer. A server running Microsoft Active Directory can be a data source for obtaining network addresses of computers being utilized by certain users. Additionally, a configuration server for accessing a cloud-based service such as Amazon Web Services (AWS) or Terremark, or a virtualization environment such as VMWare vCenter or Citrix xenCenter can be a data source for obtaining network addresses of servers that are provisioned within such a service or environment. Furthermore, a web application that provides information about various nodes in a network such as in JavaScript Object Notation (JSON) format can serve as a data source for such nodes. As is known to one of skill in the art, numerous other data sources for obtaining information about sources and destinations of network traffic are presently available. Additionally, new data sources for obtaining information about sources and destinations of network traffic in a network will undoubtedly become available in the future.

Such data sources commonly provide an application programming interface (API), a command line interface (CLI), web-based interface, or another type of interface as is known to one skilled in the art that can be utilized to retrieve information about sources and destinations of network traffic that are known to the data source. In some instances, a data source may provide in its interface a facility for searching such information so that information for a particular set of sources and destinations of network traffic that matches a given search criteria can be retrieved.

Additionally, a data source may provide in its interface a facility for retrieving all or a subset of the information that the data source has about sources and destinations of network traffic. Further, a data source may provide in its interface a facility for configuring the data source to notify a designated recipient when new or updated information about sources and destinations of network traffic becomes available to the data source. Moreover, a data source may allow a software agent, a plug-in or another type of software, which may be customized, to be integrated with the data source to provide additional interfaces or facilities for accessing information about sources and destinations of network traffic that is available to the data source. The interfaces described above can be used, for example, by embodiments of the invention to obtain information about sources and destinations of network traffic in a network.

As noted above, network devices such as firewalls, routers, load balancers, IDS/IPSes, WAFs, NATs, and other PEPs can be configured to control certain network traffic, for example, by allowing, blocking, modifying, routing, allocating bandwidth, or performing another action that can be applied to network traffic as is known to one skilled in the art. Also as noted above, such network devices are typically configured with a set of device-specific objects and device specific rules that indicate how various network traffics are to be handled. The device-specific objects and device-specific rules are commonly expressed in terms of network addresses identifying sources and destinations of network traffic. Accordingly, source and destination information accessible from a data source can be associated with a configuration of a network device.

The invention associates certain information about sources and destinations of network traffic from a data source with a configuration of a network device and updates the configuration of the network device when the data source indicates that such information about sources and destinations of network traffic has changed. By doing so, the invention allows network administrators to configure network devices to be dynamically and automatically reconfigured when a data source indicates that a source or destination of network traffic is added, removed or migrated. For example, the invention allows a network administrator to configure a network device such as a firewall to be reconfigured automatically each time a data source indicates that an authorized source or destination of network traffic has been added, removed or migrated from a network so that the firewall will continually allow network traffic to and from only authorized sources and destinations to pass through the firewall.

In an embodiment of the invention, information about sources and destinations of network traffic obtained from a data source is maintained with a dynamic object. A dynamic object is an object that holds as its value the network addresses of sources and destinations of network traffic obtained from a data source. The value of a dynamic object may change over time as the data source provides updated information about sources and destinations.

In an embodiment of the invention, in creating a dynamic object, a query is specified and associated with a data source and the dynamic object. A query is formatted (such as by a network administrator) in a manner that is compatible with the data source to obtain from the data source a result that includes a set of network addresses of sources and destinations that is relevant for configuring a network device. In addition to specifying a query, a filter may also be specified and associated with the query. The filter is formatted (such as by a network administrator) in a format that is compatible with the result of the query such that the filter can be applied to the result of the query to select further a set of network addresses that are relevant for configuring a network device. As is known to one skilled in the art, the format of the query and filter may take on a variety of forms depending on the data source and type of result provided by the data source in response to the query.

Once a query and optionally an associated filter are specified for a dynamic object, the query is sent to its associated data source to obtain an initial result from the data source. If a filter is specified, the filter is applied to the initial result to produce a filtered result. Network addresses from the result of the query (or from the filtered result if a filter was applied) are assigned as the initial value of the dynamic object. Thereafter, the value of the dynamic object is updated (by re-querying the data source with the query and applying the filter, if specified, to the query result) periodically and/or when the data source indicates that updated information about sources and destinations is available.

In some cases, a query may be registered with its associated data source such that the data source provides updated results as they become available. In such instances, if a filter is associated with the query, the filter is applied to the updated results. When such updated results are provided by the data source, network addresses from the updated result (or from the filtered updated result if a filter was applied) are assigned as the value of the dynamic object.

Accordingly, once a dynamic object is created and associated with a query and optionally a filter, the value of the dynamic object is updated to hold the latest set of network addresses of sources and destinations of network traffic, which satisfy the query and optional filter, as they become known to the associated data source. As an example, a network administrator may fashion a query and a filter to obtain from an Active Directory server a set of network addresses of computers on which certain authorized users are presently logged in. The network administrator may first fashion a query to obtain from the server a result including a set of network addresses of computers as well as the authorized users that are logged into each such computer. The network administrator could then fashion a filter to obtain from the query result a set of network addresses of computers in which only pertinent users are logged into. As new information about authorized users logging into and out of computers becomes available to the Active Directory server, the query and the filter are re-applied to such information and the dynamic object is updated to hold the latest results of the query and filter. Accordingly, the value of the dynamic object is updated to reflect the network addresses of the set of computers on which certain authorized users are logged into as that set changes over time.

In addition to dynamic objects, static objects and group objects may also be created in an embodiment of the invention. A static object is an object that is not associated with a query, a filter or a data source and holds as its value an explicit network address or an explicit network address range. For IP network addresses, a static object can hold, for example, an explicit IP address, an IP range (specified with two IP addresses designating the starting and ending IP addresses of the range), or an IP network (specified with an IP address and a subnetwork mask). A group object is an object that can be empty or include one or more static objects, dynamic objects, or other group objects. The value of a group object is the aggregate value of all the static objects, dynamic objects, and other group objects that are included in the group object. Accordingly, if a group object includes one or more dynamic objects, the value of the group object will change when the value of any of its dynamic objects changes.

In an embodiment of the invention, a configuration of a network device is made to be updated when changes to a set of sources and destinations of network traffic are detected by associating a device-specific object of the network device with one or more dynamic, static or group objects, and reconfiguring the device-specific object of the network device when a change to the value of an associated dynamic or group object is detected.

As an example, suppose that a network device such as a firewall is configured with a device-specific object named white_list and a rule such as "allow white_list" so that traffic to and from computers having network addresses referenced in the white_list is allowed to pass through the firewall. Furthermore, suppose that the white_list is to reference only network addresses of computers in which authorized users are logged in. Also, further suppose that the current set of network addresses of computers being utilized by authorized users is accessible from a data source such as a server running Active Directory. To cause the firewall to be reconfigured automatically when the set of computers being utilized by authorized users changes, a dynamic object can be created to obtain from the data source the current set of network addresses of computers that are being utilized by authorized users. When a change to the value of the dynamic object is detected, thereby indicating that the set of computers being utilized by authorized users has changed, the white_list device-specific object of the firewall is reconfigured to reference the latest set of network addresses held by the dynamic object. By updating the white_list device-specific object of the firewall with the value of the dynamic object when its value changes, the firewall is automatically reconfigured to allow traffic from authorized computers to pass through the firewall as the set of authorized computers changes over time.

As a further example, suppose that in the preceding example that information pertaining to the set of computers in which authorized users are logged in is partially available from a server running Active Directory and that the remainder is available from another server providing a lightweight directory access protocol (LDAP) service. In such a situation, to cause the firewall to be reconfigured when the set of computers that are being utilized by authorized users changes, a first dynamic object can be created to hold the latest set of network addresses of computers that Active Directory knows are being utilized by authorized users and a second dynamic object can be created to hold the latest set of network addresses of computers that the LDAP server knows are being utilized by authorized users. Additionally, a group object can be created to hold both the first and second dynamic objects so that the group object represents the complete set of network addresses of computers being utilized by authorized users. If a change to the value of the first or the second dynamic object is detected, thereby causing the value of the group object to change as well, the white_list device-specific object of the firewall is reconfigured to reference the latest set of network addresses held by the group object. By updating the white_list device-specific object of the firewall with the value of the group object as its value changes, the firewall is automatically reconfigured to allow traffic from authorized computers to pass through the firewall as the set of authorized computers, which are identified by multiple data sources, changes over time.

In an embodiment of the invention, the configurations of multiple network devices are made to be updated upon changes to a set of sources and destinations of network traffic by associating a dynamic object (or alternatively a group object) representing that set of sources and destinations with at least one device-specific object of each of the network devices and updating such device-specific objects on each network device with the value of the dynamic object (or the value of the group object as the case may be) when its value changes.

As will be appreciated by one skilled in the art, the invention allows multiple dynamic objects and group objects, which can include static, dynamic and other group objects, to be created to represent different sets of sources and destinations of network traffic. Additionally, the values of multiple dynamic objects may be obtained from a single data source as well as from multiple data sources. Furthermore, multiple device-specific objects on a network device may be associated with a single dynamic object or a single group object. In addition, each of multiple device-specific objects on a network device may be associated with a different dynamic object or group object. When the value of a dynamic object or a group object changes, the device-specific objects of the network devices that are associated with the changed dynamic object or group object as the case may be are updated to reflect the changed value.

In an embodiment of the invention, when a device-specific object of a network device is to be updated and is to be assigned an empty value because, for example, the value of the group object or the dynamic object associated with the device-specific object takes on an empty value, the device-specific object is assigned a reserved network address rather than an empty value. For device-specific objects that hold IF network addresses, the reserved network address is preferably IP address 0.0.0.1 or any other IP address that is not generally routable on the Internet or would not typically be used to identify a source or destination of network traffic. In an embodiment, the value of the reserved network address may be specified by a network administrator. Assigning a reserved network address to a device-specific object may be necessary when a network device does not support device-specific objects that reference an empty set of network addresses. Accordingly, when a device-specific object of such a network device is to be assigned an empty value because it is associated with a dynamic object or a group object having an empty value, the reserved network address is assigned to the device-specific object to satisfy the network device's requirement that its device-specific objects must reference at least one network address. If the reserved network address is generally not routable on the Internet or is one that is not typically assigned to a source or destination, assigning the reserved network address to the device-specific object should have the same effect as assigning an empty set of network addresses to the device-specific object.

In an embodiment of the invention, when an error occurs in attempting to update the value of a dynamic object from a data source, the present value of the dynamic object is maintained until the error is resolved. Alternatively, the dynamic object is set to hold an empty value. Preferably, if the error appears to be transient such as, for example, the data source cannot be reached due to a network connectivity issue, the present value of the dynamic object is maintained until the error is resolved. Also preferably, if the error appears to be permanent such as, for example, the data source no longer exists, the dynamic object is set to hold an empty value.

Aspects of the invention are further described below with respect to the figures.

FIG. 1 is a block diagram of an exemplary system 100 in accordance with the invention. System 100 includes a controller 110, data sources 102, 104, 106 and 108, network devices 112, 114, 116 and 118, and configuration client 120.

Each of the network devices 112, 114, 116 and 118 can be, for example, a firewall, router, load balancer, IDS/IPS, WAF, NAT, PEP or any other device that can be configured to control certain network traffic. Examples of such network devices include CISCO ASA firewalls, CISCO IOS routers, and Juniper SRX firewalls. Additionally, network devices 112, 114, 116 and 118 can be heterogeneous. For example, two or more of the network devices 112, 114,116 and 118 can each be of a different type (e.g., firewall, router, NAT, etc.), from different vendors (e.g., CISCO, Juniper, etc.), or be executing different versions of software or firmware.

Each of the data sources 102, 104, 106 and 108 can be, for example, a server, a database, a network device, or any other computing device that can provide information about sources and destinations of network traffic. Examples of such data sources include a DNS server, a server running Active Directory, a server for accessing a cloud service such as Amazon Web Services (AWS) or Terremark or a server for accessing a virtualization environment such as VMWare vCenter or xenCenter. Similar to network devices 112, 114, 116 and 118, data sources 102, 104, 106 and 108 can be heterogeneous. Information about sources and destinations of network traffic available to a data source may change over time as sources and destinations are added to, removed from or migrated within a network.

Controller 110 communicates with one or more data sources, such as data sources 102, 104, 106 and 108, to obtain information about sources and destinations of network traffic and communicates with one or more network devices, such as network devices 112, 114, 116 and 118, to reconfigure such network devices in accordance with the invention. To facilitate communication with controller 110, each of the data sources 102, 104, 106 and 108 and network devices 112, 114, 116 and 118 may optionally include an agent, plug-in or another type of software (depicted as a dotted box in each of 102, 104, 106, 108, 112, 114, 116, 118) to facilitate communication with controller 100. Controller 110 may be implemented as software executing on a computing device. Additionally, controller 110 provides an interface such as an API, CLI, web interface, or another type of interface as is known to one skilled in the art that can be utilized to configure, control or monitor controller 110.

Configuration client 120 communicates with controller 110 using an interface provided by controller 110 to configure, control or monitor controller 110. Configuration client 120 can be, for example, a web browser executing on a computer for displaying web pages served by controller 110 that allows a network administrator to configure, control or monitor controller 110. Configuration client 120 can also be, for example, a command line shell executing on a computer for interacting with a CLI interface of controller 110.

By using configuration client 120, a network administrator can create one or more dynamic objects, group objects and static objects on controller 110. In creating a dynamic object, the network administrator specifies a query and a data source to which the query is to be applied. The network administrator may additionally specify a filter to be applied to the results of the query. In specifying the data source, the network administrator may provide the network address of the data source and/or credentials needed to log into the data source so that controller 110 can communicate with the data source. In specifying the query, the network administrator formats the query in a manner that is compatible with the data source and fashions the query in such a manner that when the query is sent to the data source, the data source will provide a result that includes a set of network addresses identifying a set of sources and destinations of network traffic that the network administrator is concerned with. In specifying a filter, the network administrator formats the filter in such a manner to further identify from the query result a set of network address that the network administrator is concerned with.

For example, if a network administrator wishes to create a dynamic object to keep track of all of the computers being currently utilized by the accounting department of an enterprise, the network administrator could fashion a query that is to be sent to a pertinent data source to obtain a set of network addresses of all computers being utilized in the enterprise along with information about which departments are using each such computer. The network administrator could then fashion a filter to obtain from the query result only the network addresses of computers being utilized by the accounting department. In another example, if a network administrator wishes to create a dynamic object to keep track of the network address of a computer having a particular hostname, the network administrator could fashion a query that sends the hostname to a DNS server that is configured to provide the latest network address for that hostname. In yet another example, if a network administrator wishes to create a dynamic object to keep track of the servers associated with a particular tag in AWS, the network administrator would fashion a query to A WS to obtain the set of network addresses that are associated with servers having that particular tag. As is known to one skilled in the art, a query can specified in a variety of formats based on the data source the query is intended to be applied.

Additionally, as is known to one skilled in the art, a filter can be specified in a variety of formats based on the form of a query result.

Once a dynamic object is created, controller 110 sends the query associated with the dynamic object to the associated data source to obtain an initial result. If a filter is associated with the dynamic object, controller 110 applies the filter to the result of the query to produce a filtered result. Controller 110 then assigns the network addresses obtained in the result of the query (or from the filtered result if a filter was applied)

as the initial value of the dynamic object. Thereafter, controller 110 updates the value of the dynamic object (by re-querying the data source with the query and applying any associated filter to the query result) periodically and/or when the data source indicates that updated information about sources and destinations of network traffic is available. In some cases, controller 110 may register the query with the data source and ask the data source to provide updated results as new information about sources and destinations of network traffic become available to the data source. In those cases, if a filter is associated with the query, controller 110 applies the filter to the updated results. When such updated results are received by controller 110, the network addresses from the updated result (or from the filtered updated result if a filter was applied) are assigned as the value of the dynamic object. Accordingly, controller 110 causes each dynamic object to hold as its value the latest set of network addresses known to the associated data source which satisfy the associated query and any associated filter of the dynamic object.

In addition to creating one or more dynamic objects on controller 110, a network administrator can create on controller 110 one or more static and group objects to form additional sets of sources and destinations of network traffic. For example, a network administrator can create a group object that holds multiple static objects and multiple dynamic objects to represent a set of sources and destinations represented by such static and dynamic objects. Additionally, a network administrator can create a group object that includes other group objects (as well as static and dynamic objects). Accordingly, a network administrator can represent numerous different sets of sources and destinations of network traffic by creating on controller 110 various dynamic objects, static objects, and group objects.

Furthermore, by using configuration client 120, a network administrator can associate device-specific objects of network devices with dynamic objects and group objects on controller 110. Once a device-specific object of a network device is associated with one or more dynamic objects, controller 110 reconfigures the network device when the value of an associated dynamic object changes so that the device-specific object on the network device is expressed in terms of the latest set of network addresses held by the associated dynamic object. Likewise, once a device-specific object of a network device is associated with one or more group objects, controller 110 reconfigures the network device when the value of the associated group object changes so that the device-specific object on the network device is expressed in terms of the latest set of network addresses held by the associated group object. In associating a device specific object of a network device with a dynamic object or a group object, the network administrator may provide the network address of the network device, credentials needed to log into the network device, and the platform type of the network device (e.g., such information as vendor and version information) so that controller 110 can communicate with the network device.

By creating on controller 110 a dynamic object or a group object, and associating the dynamic or group object with a device-specific object of a network device, controller 110 automatically reconfigures the network device by causing the device-specific object on the network device to reflect the value of the associated dynamic object or group object as the value of the associated dynamic object or group object changes over time.

Figure 2:
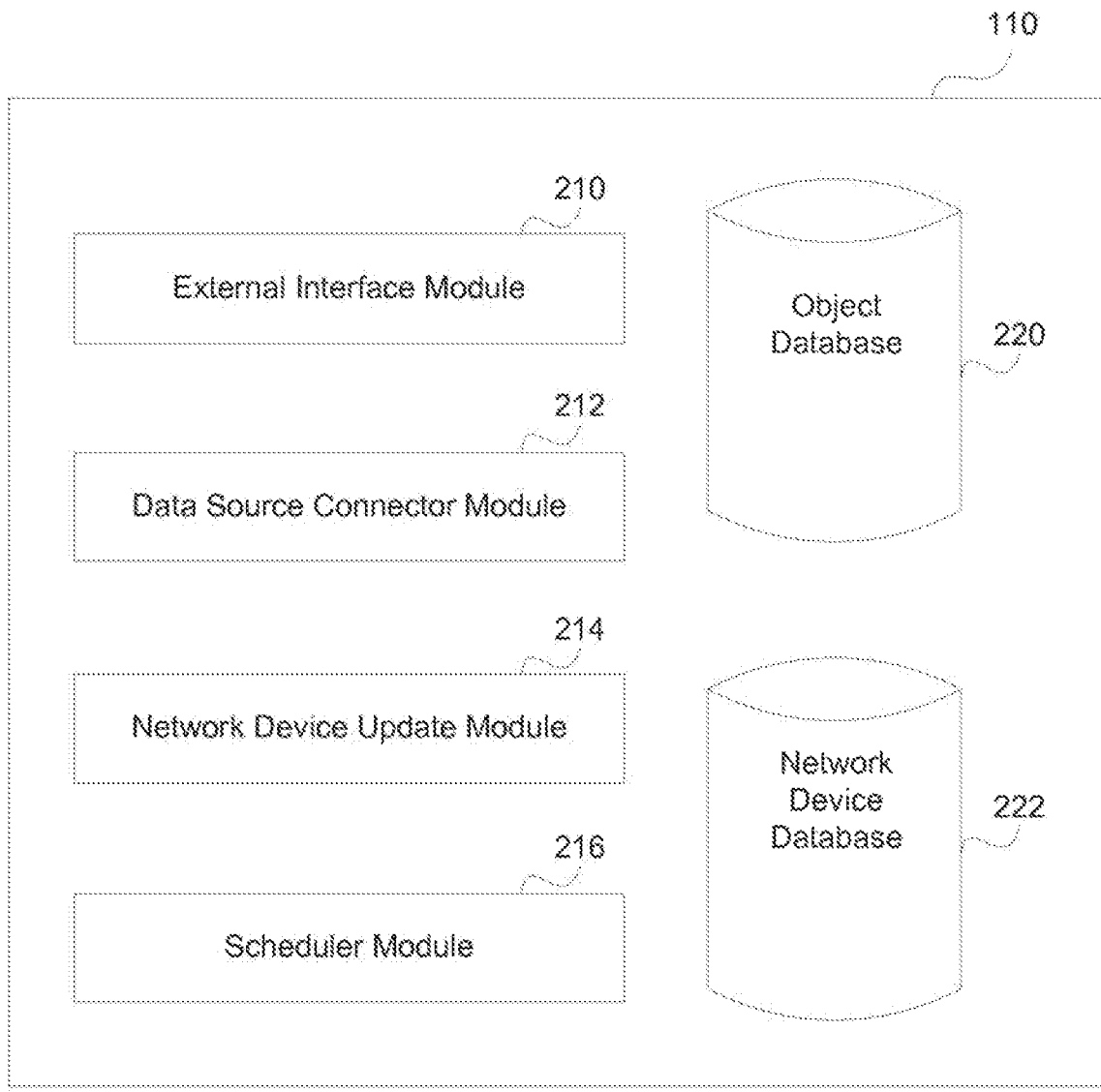
FIG. 2 is an exemplary block diagram of a controller apparatus in accordance with the invention.

FIG. 2 is an exemplary block diagram of controller 110. Controller 110 includes external interface module 210, data source connector module 212, network device update module 214, scheduler module 216, object database 220 and network device database 222.

External interface module 210 provides an interface for configuring, controlling or monitoring controller 110. For example, the interface provided by external interface module 210 may be utilized by configuration client 120 (shown in FIG. 1) to allow a network administrator to configure, control or monitor controller 110. As such, external interface module 218 provides an interface to a network administrator to allow the network administrator to create dynamic, static and/or group objects on controller 110 and associate them with one or more device-specific objects of one or more network devices.

When dynamic, static and group objects are created in controller 110, they are stored in object database 220. For a given dynamic object, object database 220 may hold the query associated with the dynamic object, information necessary to communicate with the data source associated with the query, a filter associated with the query, and the current value of the dynamic object.

To associate a dynamic object or a group object with a device-specific object on a network device, a representation of the network device is first created and stored in network device database 222. A representation of a network device stored in database 222 is referred to herein as a device entity. By accessing external interface module 210, a network administrator may cause a device entity for a network device to be created in database 222. The device entity holds the network address of the network device, credentials needed to log into the network device, and/or the platform type of the network device (e.g., such information as vendor and version information) so that controller 110 can communicate with the network device. The device entity also holds information about device-specific objects on the network device including the names of the device-specific objects. The information held for the device entity in database 222 may be manually input by a network administrator by accessing external interface module 210. Alternatively, a network administrator may simply provide controller 110 with the network address and credential information necessary to log into a network device and cause controller 110 to communicate with the network device to automatically obtain information about the vendor type of the network device and/or device-specific objects on the network device. Additionally, a network administrator may add to a device entity a name of a new device-specific object that does not yet exist on the network device being represented by the device entity. When a name of a new device-specific object is added to a device entity, controller 110 updates the configuration of the network device being represented by the device entity to create on the network device a new device-specific object having the specified name. Accordingly, a network administrator can access controller 110 to create new device-specific objects on network devices.

Once a device entity is created in database 222 for a network device, a device-specific object of the network device can be associated with a dynamic object or a group object stored in database 220 by specifying in the device entity that the name of the device-specific object is associated with the dynamic object or the group object. When a device-specific object is initially associated with a dynamic object or a group object, controller 110 updates the device-specific object on the network device to reflect the value of the associated dynamic object or the group object.

Data source connector module 212 communicates with data sources and determines if the value of a dynamic object in object database 220 has changed. For a given dynamic object, a network administrator may configure controller 110 so that data source connector module 212 sends the query associated with the dynamic object to the associated data source periodically and/or when the data source indicates to controller 110 that updated information about sources and destinations is available. Alternatively, for a given dynamic object, a network administrator may configure controller 110 so that data source connector module 212 registers the associated query with the data source such that the data source provides data source connector module 212 with updated results as they become available. Either way, when results of the query to the data source are received by data source connector module 212, a filter if associated with the query is applied to the query result to produce a filtered result. When a query result is received, the network addresses in the query result (or in the filtered result if a filter was applied to the query result) are obtained and represent the latest value of the dynamic object. Accordingly, when a query result is obtained, data source connector module 212 compares the latest value in the query result with the value of the dynamic object that was previously stored in object database 220. If they differ, data source connector module 212 determines that the value of the dynamic object has changed and the latest value is stored as a new value of the dynamic object in object database 220. Furthermore, if the value of the dynamic object has changed, controller 110 inspects object database 220 for all object groups that include or are dependent on the value of the dynamic object and identifies those object groups as also having values that have changed (as a result of the dynamic object changing value). Thereafter, controller 110 reconfigures network devices having a device-specific object that is associated with a dynamic object or a group object having a value that has changed.

Network device update module 214 communicates with network devices and reconfigures a network device when a dynamic object or a group object associated with a device specific object of the network device takes on a new value. A network administrator may configure controller 110 so that for a given network device, network device update module 214 reconfigures only the device-specific objects on the network device that are associated with the dynamic object or group object having a new value. Alternatively, a network administrator may configure controller 110 so that for a given network device, the network device is reconfigured in its entirety when a dynamic object or a group object associated with a device-specific object of the network device takes on a new value. In updating the network device, network device update module 214 may communicate with the network device and issue a set of commands to reconfigure the network device. Alternatively, network device update module 214 may first generate a script for reconfiguring the network device and communicate with the network device to cause the script to be executed by the network device to reconfigure the network device.

Scheduler module 216 facilitates scheduling of certain actions performed by controller 110. Scheduler module 216 schedules data source connector module 212 to periodically communicate with data sources to determine whether the values of dynamic objects stored in object database 220 needs to be updated. When data source connector module 212 is configured for certain dynamic objects to wait for updated results from their associated data sources, scheduler module 216 may monitor the network and cause the data source connector module 212 to update applicable dynamic objects in object database 220 when scheduler module 216 detects that new data has been received from a data source. When the value of a dynamic object or group object in object database 220 changes, scheduler module 216 schedules network device update module 214 to reconfigure network devices having device-specific objects that are associated with the changed dynamic object or group object.

Figure 3:
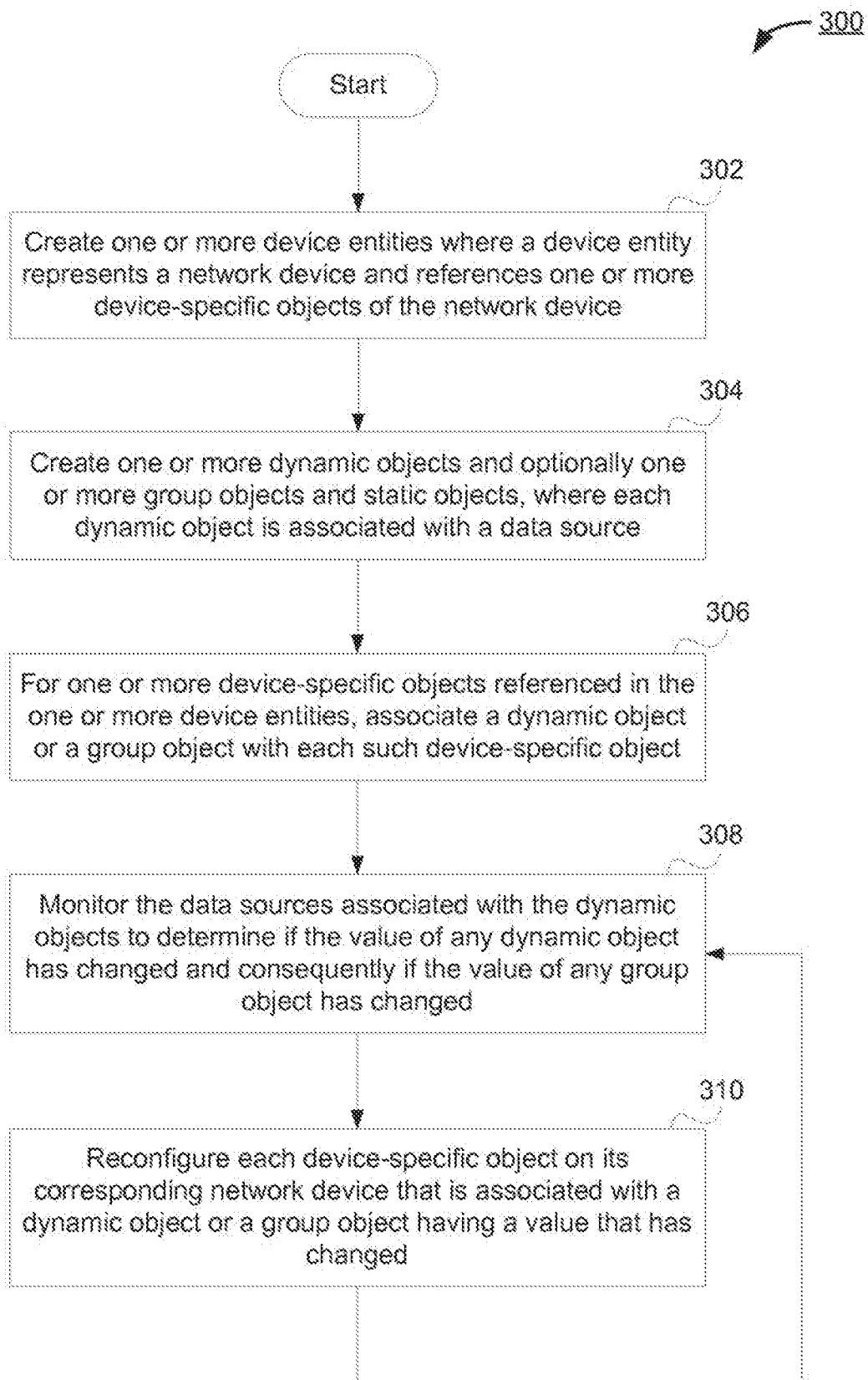
FIG. 3 is a flow diagram providing an exemplary process III accordance with the invention.

FIG. 3 is a flow diagram providing an exemplary process 300 in accordance with the invention by which one or more network devices are automatically reconfigured when changes to one or more sets of sources and destinations of network traffic are detected. Process 300 starts with step 302.

In step 302, one or more device entities, each representing a network device, are created and stored in network device database 222. A network administrator may access external interface module 210 to instruct controller 110 to create a device entity for a network device in network device database 222. In creating a device entity, information such as the network address of the associated network device, credentials needed to log into the network device, and/or the platform type of the network device (e.g., such information as vendor and version information) are provided to controller 110 (such as by the network administrator) and stored as part of the device entity. Such information is later used by controller 110 to communicate with the network device being represented by the device entity.

In creating a device entity, one or more names of device-specific objects are specified and stored with the device entity. Such a name may identify a device-specific object that already exists on the network device being represented by the device entity. Alternatively, such a name may identify a new device-specific object that is to be created on the network device being represented by the device entity. Such names are formatted in a manner that is compatible with the naming conventions for device-specific objects on the network device.

Additionally, when a device entity is created, controller 110 may communicate with the associated network device to retrieve information about existing device-specific objects on the network device and store the names of such device-specific objects as part of the device entity.

In step 304, one or more dynamic objects, static objects and group objects are created and stored in object database 220. A network administrator may access external interface module 210 to instruct controller 110 to create one or more dynamic objects, static objects or group objects in object database 220 of controller 110. In creating the dynamic object, information such as the network address of a data source and the credentials needed to log into the data source are provided to controller 110 and stored in association with the dynamic object. Additionally, a query to the data source is specified for the dynamic object. Furthermore, a filter to be applied to results of the query is optionally specified for the dynamic object.

When a dynamic object is created, controller 110 communicates with its associated data source and sends its associated query to the data source to obtain an initial result of the query. If a filter is associated with the query, the filter is applied to the initial result of the query. The network addresses in the query result (or in the filtered result if a filter was applied) is stored as the initial value of the dynamic object.

In addition to creating one or more dynamic objects, a network administrator may access external interface module 210 to instruct controller 110 to create group objects to define sets of network addresses specified by one or more static, dynamic or other group objects. As described above, the value of a group object is the aggregate value of all static, dynamic or other group objects included in the group object. Accordingly, the value of a group object represents a set of all network addresses included in the values of all static, dynamic or other group objects included in the group object.

In step 306, one or more device-specific objects of one or more network devices are associated with one or more dynamic objects or group objects stored in object database 220. A device-specific object of a network device is associated with a dynamic object or a group object by storing in the device entity, which represents the network device, an association between the dynamic object or group object and the name of the device-specific object. By creating such associations, controller 110 can determine which device-specific objects on which network devices needs to be updated when the value of a dynamic object or a group object changes.

When an association between a dynamic object or a group object and a name of a device-specific object is created in a device entity, controller 110 preferably communicates with the network device being represented by the device entity to ensure that the device-specific object exists on the network device and that the value of the device-specific object reflects the value of the associated dynamic object or group object. Since it is possible that the name of the device-specific object refers to a new device-specific object that is to be created on the network device (as discussed in step 302 above), controller 110 checks whether a device-specific object referred to by that name already exists on the network device. If such a device-specific object does not exist, controller 110 provides commands to the network device to create such a device specific object. Additionally, controller 110 provides commands to the network device so that the device-specific object holds a value that reflects the current value of the associated dynamic object or group object.

In step 308, controller 110 monitors data sources associated with the dynamic objects in object database 220 to determine whether the value of a dynamic object has changed and whether the value of any group objects has changed as a consequence. For a given dynamic object, controller 110 may periodically poll the data source associated with the dynamic object to ascertain whether the value of the dynamic object has changed. Alternatively, controller 110 can request the data source associated with the dynamic object to notify controller 110 when new information relevant to the dynamic object becomes available. When controller 110 polls the data source or is notified by the data source that new information is available, controller 110 sends the query associated with the dynamic object to the data source to obtain an updated query result. Alternatively, controller 110 may register the query with the data source such that the data source provides controller 110 with updated query results as they become available to the data source. When an updated query result is received by controller 110, whether by polling or registering the query with the data source, a filter, if associated with the query, is applied to the query result to produce a filtered result. The set of network addresses in the query result (or in the filtered result if a filter was applied) is identified as the latest value for the dynamic object. The latest value is compared against the value of the dynamic object stored in object database 220 to determine if the latest value is different from the value of the dynamic object stored in object database 220. If the latest value differs from the stored value, controller 110 determines that the value of the dynamic object has changed and that the latest value represents a new value or the dynamic object. When a new value of a dynamic object becomes available, the new value is stored as the value of the dynamic object in object database 220. Additionally, controller 110 identifies whether the values of any group objects in object database 220 has changed as a result of the dynamic object taking on a new value. Thereafter, controller 110 refers to the device entities stored in network device database 222 to identify the network devices that have device-specific objects that are associated with the dynamic object or a group object, which has changed values as a result of the dynamic object changing values. Those network devices are reconfigured in step 310 to reflect the new values of the dynamic object and any such group objects.

In step 310, controller 110 reconfigures network devices having device-specific objects that are associated with a dynamic object or a group object that has taken on a new value. For each such network device, controller 110 communicates with the network device and provides commands to the network device to cause each device-specific object, which is associated with a dynamic object or a group object having a new value, to take on the new value. Thereafter, process 300 continues to step 308 so that data sources are further monitored to detect additional changes in the values of dynamic objects and group objects and so that network devices are reconfigured according to such additional changes.

In an embodiment of the invention, when the value of a dynamic object or a group object changes, only the device-specific objects, which are associated with the dynamic object or the group object, are reconfigured on a network device.

In an embodiment of the invention, other than device-specific objects, additional aspects of the configuration of a network device such as device-specific rules can be stored with the device entity representing the network device. In such embodiments, controller 110 can allow such other aspects of the configuration of the network device to be modified. For example, a network administrator may specify with controller 110 that a new device-specific rule should be associated with the network device. Additionally, a network administrator may specify with controller 110 that an existing device-specific rule should be altered or deleted from the network device. In such an embodiment, controller 110 can be instructed to reconfigure not only the device-specific objects when their associated dynamic objects or group objects take on a new value, but controller 110 can also be instructed to reconfigure the network device to reconfigure those other aspects of the configuration of the network device when they are modified.

In an embodiment of the invention, controller 110 periodically communicates with each of the network devices having one or more configurations (e.g., a device-specific object) that are associated with one or more dynamic, static or group objects to determine if any such configuration on the network device is inconsistent with the value of its associated dynamic, static and group objects. If a configuration on the network device is inconsistent with the value of its associated dynamic, static and group objects, controller 110 updates the configuration on the network device to reflect the value of its associated dynamic, static and group objects. A configuration on a network device may become inconsistent with its associated dynamic, static and group objects for several reasons. For example, a configuration on a network device may become inconsistent because controller 110 was unable to previously update the configuration due to issues with network connectivity or with the network device itself. Additionally, a configuration of a network device may become inconsistent if an administrator manually modifies the configuration (e.g., accidentally) or if another administrative tool or system modifies the configuration. Accordingly, controller 110 periodically checks the network devices to ensure that the configurations on the network devices that are associated with dynamic, static and group objects are expressed consistently with the values of the associated dynamic, static and group objects. Additionally, in an embodiment of the invention, controller 110 may be configured to maintain other aspects of the configuration of a network device than those that are associated with a dynamic, static or group object. In such an instance, values for those other aspects of the configuration are stored with controller 110 and controller 110 periodically communicates with the network device to ensure that those other aspects of the configuration on the network device are consistent with the values stored on controller 110. If they are inconsistent, controller 100 updates those other aspects of the configuration on the network device to reflect the values that are stored in controller 110.

Figure 4:
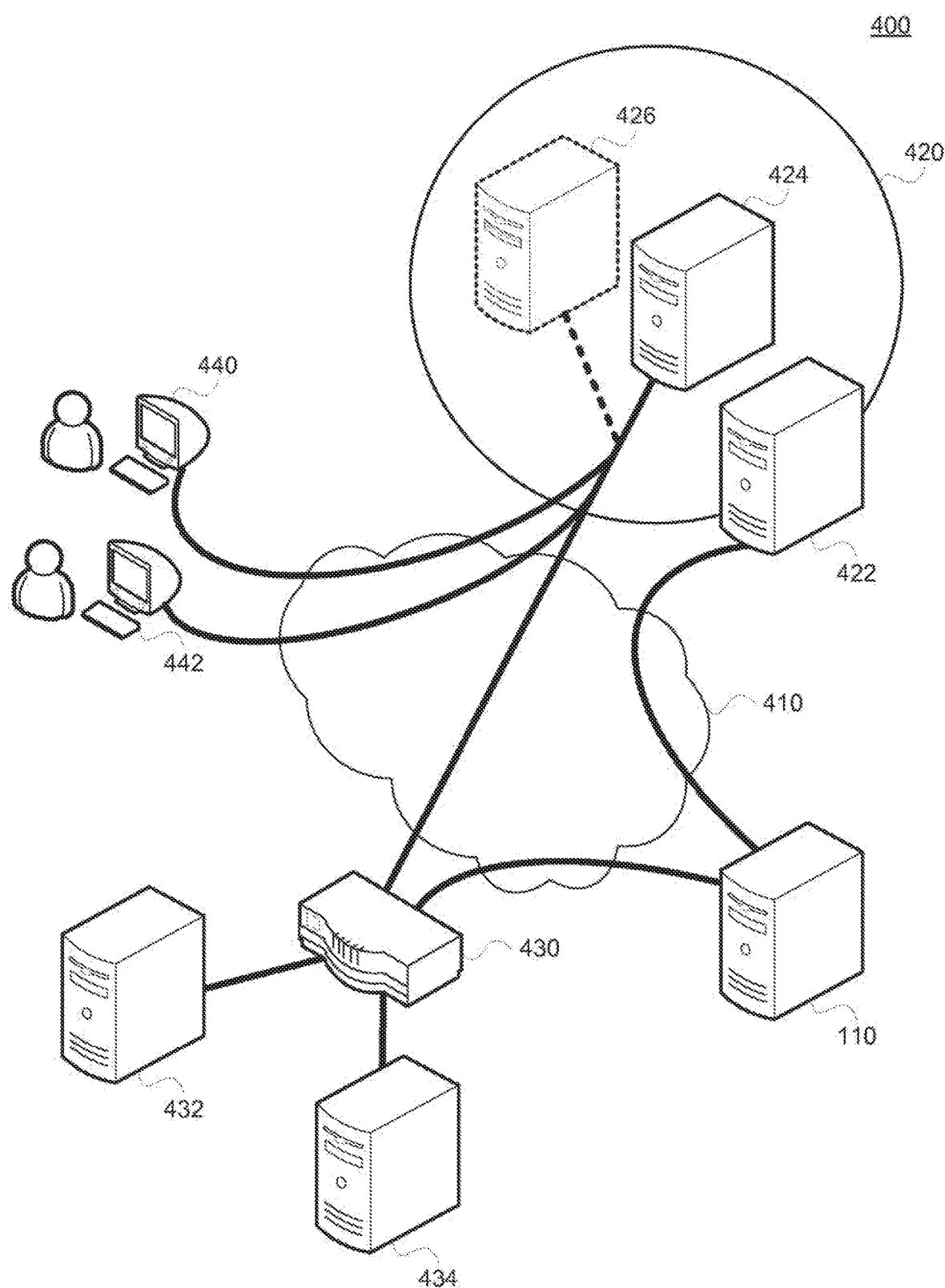
FIG. 4 depicts an exemplary operation of an exemplary system in accordance with the invention.

As described above, controller 110 can be configured to reconfigure network devices automatically when changes to a set of sources and destinations of network traffic are detected. FIG. 4, which is described below, depicts an exemplary operation of controller 110.

FIG. 4 depicts an exemplary operation of an exemplary system 400 for updating the configuration of a network device in accordance with the invention. While system 400 illustrates a simplified system for explanatory purposes, the invention may be applied in much more complicated configurations, as shown in FIG. 1, that encompass numerous heterogeneous network devices and numerous heterogeneous data sources.

System 400 includes controller 110, firewall 430, user database 432, game database 434, user client devices 440 and 442, cloud service 420 and the Internet 410. Cloud service 420 includes cloud admin server 422 for configuring and monitoring cloud service 420. Additionally, cloud service 420 includes one or more servers, such as server 424 and 426, that can be provisioned (by accessing cloud admin server 422) to provide a game service that are accessed by user client devices 440 and 442.

Controller 110 is configured with a dynamic object that specifies a query to cloud admin server 422 for obtaining network addressees of the servers that are provisioned to provide the game service on cloud service 420. Additionally, cloud admin server 422 is configured to notify controller 110 when the set of servers, which are provisioned on cloud server 420 for providing the game service, changes.

Controller 110 is further configured with a device entity that represents firewall 430. The device entity identifies that firewall 430 includes a device-specific object named white_list that is associated with the dynamic object.

Firewall 430 is configured with a device-specific object named white_list and a device specific rule "allow white_list" that allows only network traffic to and from computers having network addresses listed in white_list to pass through firewall 430 to access user database 432 and game database 434.

Initially, only server 424 is provisioned in cloud service 420 to provide the game service and the value of the dynamic object and the value of the white_list device-specific object on firewall 430 includes only the network address of server 424.

Subsequently, when server 426 is provisioned in cloud server 420 to also provide the game service, controller 110 is notified by cloud admin server 422 that the set of servers provisioned to provide the game service on cloud service 420 has changed. Controller 110 then queries the cloud admin sever 422 to update the value of the dynamic object. In doing so, controller 110 determines that the value of the dynamic object has changed to now include the network addresses of both servers 424 and 426. Controller 110 references the device entity and determines that the white_list device-specific object of firewall 430 needs to be updated since it is associated with the dynamic object. Hence, controller 110 communicates with firewall 430 and updates the value of the white_list device-specific object on firewall 430 to have the network addresses of servers 424 and 426.

Accordingly, as the set of servers provisioned on cloud service 420 to provide the game service changes over time, controller 110 automatically reconfigures firewall 430 so that firewall 430 will only allow traffic to and from servers provisioned in cloud service 420 for providing the game service to pass through the firewall to access user database 432 and game database 434.

The various embodiments including systems, apparatuses, and processes and components thereof described herein may be implemented as hardware or as a combination of hardware and software. Such hardware may include, for example, a computer with a hardware processor, memory, a network interface, an input device and an output device as will be apparent to one of skill in the computer arts. Software may be stored as instructions and data on a computer-readable medium. When the instructions on such computer-readable medium are executed by a processor of a computer, the computer may be caused to implement various embodiments and components thereof described herein. Examples of a computer readable medium include magnetic media, optical media, flash media, as well as any other medium that can hold software instructions and data as will be apparent to one of skill in the computer arts. Software stored on computer-readable medium may be provided as a computer program product.

What is claimed is:

1. A method for dynamically updating a network device configuration, the method comprising:
   obtaining or receiving, by an administrator computer from a data source, network addresses of sources and destinations of network traffic monitored by or under control of a network device, the sources and destinations of network traffic comprising a set of devices provisioned to be sources and destinations of network traffic, and wherein the set of devices provisioned to be sources and destinations of network traffic can change over time;
   assigning, by the administrator computer, the network addresses obtained or received from the data source as a value of a dynamic object, the dynamic object associated with a first device-specific object of the network device, the dynamic object being updatable by the administrator computer;
   periodically or responsive to an indication from the data source that updated information about the sources and the destinations is available, obtaining or receiving, by the administrator computer from the data source, latest network addresses of the sources and the destinations and updating the value of the dynamic object associated with the first device-specific object to hold the latest network addresses of the sources and the destinations; and
   automatically dynamically configuring the first device-specific object of the network device with the updated value of the dynamic object such that the first device-specific object of the network device references the latest network addresses of the sources and the destinations of network traffic monitored by or under control of the network device to reflect changes to the set of devices provisioned to be sources and destinations of network traffic.

2. The method of claim 1, wherein the data source comprises at least one of a domain name system server, an active directory server, a service configuration server, or a web application.

3. The method of claim 1, further comprising:
associating a query with the data source and the dynamic object, wherein the obtaining or receiving is performed by the administrator computer utilizing the query.

4. The method of claim 3, further comprising:
applying a filter to a result of the query, the applying producing a subset of the network addresses.

5. The method of claim 1, wherein the dynamic object is one of a plurality of dynamic objects associated with the device-specific object of the network device.

6. The method of claim 5, wherein a group object holds the plurality of dynamic objects, the group object representing a complete set of network addresses of the sources and the destinations of network traffic monitored by or under control of the network device.

7. The method of claim 1, wherein the latest network addresses of the sources and the destinations reflect at least one of an addition, a removal, or a migration of a network address of the network addresses obtained or received from the data source.

8. A system for dynamically updating a network device configuration, the system comprising:
a processor;
a non-transitory computer-readable medium; and
stored instructions translatable by the processor for:
obtaining or receiving, from a data source, network addresses of sources and destinations of network traffic monitored by or under control of a network device, the sources and destinations of network traffic comprising a set of devices provisioned to be sources and destinations of network traffic, and wherein the set of devices provisioned to be sources and destinations of network traffic can change over time;
assigning the network addresses obtained or received from the data source as a value of a dynamic object, the dynamic object associated with a device-specific object of the network device, the dynamic object being updatable by the administrator computer;
periodically or responsive to an indication from the data source that updated information about the sources and the destinations is available, obtaining or receiving, from the data source, latest network addresses of the sources and the destinations and updating the value of the dynamic object associated with the first device-specific object to hold the latest network addresses of the sources and the destinations; and
automatically dynamically configuring the first device-specific object of the network device with the updated value of the dynamic object such that the first device-specific object of the network device references the latest network addresses of the sources and the destinations of network traffic monitored by or under control of the network device to reflect changes to the set of devices provisioned to be sources and destinations of network traffic.

9. The system of claim 8, wherein the data source comprises at least one of a domain name system server, an active directory server, a service configuration server, or a web application.

10. The system of claim 8, wherein the stored instructions are further translatable by the processor for:
associating a query with the data source and the dynamic object, wherein the obtaining or receiving is performed utilizing the query.

11. The system of claim 10, wherein the stored instructions are further translatable by the processor for:
applying a filter to a result of the query, the applying producing a subset of the network addresses.

12. The system of claim 8, wherein the dynamic object is one of a plurality of dynamic objects associated with the device-specific object of the network device.

13. The system of claim 12, wherein a group object holds the plurality of dynamic objects, the group object representing a complete set of network addresses of the sources and the destinations of network traffic monitored by or under control of the network device.

14. The system of claim 8, wherein the latest network addresses of the sources and the destinations reflect at least one of an addition, a removal, or a migration of a network address of the network addresses obtained or received from the data source.

15. A computer program product for dynamically updating a network device configuration, the computer program product comprising a non-transitory computer-readable medium storing instructions translatable by the processor for:
obtaining or receiving, from a data source, network addresses of sources and destinations of network traffic monitored by or under control of a network device, the sources and destinations of network traffic comprising a set of devices provisioned to be sources and destinations of network traffic, and wherein the set of devices provisioned to be sources and destinations of network traffic can change over time;
assigning the network addresses obtained or received from the data source as a value of a dynamic object, the dynamic object associated with a device-specific object of the network device, the dynamic object being updatable by the administrator computer;
periodically or responsive to an indication from the data source that updated information about the sources and the destinations is available, obtaining or receiving, from the data source, latest network addresses of the sources and the destinations and updating the value of the dynamic object associated with the first device-specific object to hold the latest network addresses of the sources and the destinations; and
automatically dynamically configuring the first device-specific object of the network device with the updated value of the dynamic object such that the first device-specific object of the network device references the latest network addresses of the sources and the destinations of network traffic monitored by or under control of the network device to reflect changes to the set of devices provisioned to be sources and destinations of network traffic.

16. The computer program product of claim 15, wherein the data source comprises at least one of a domain name system server, an active directory server, a service configuration server, or a web application.

17. The computer program product of claim 15, wherein the instructions are further translatable by the processor for:

associating a query with the data source and the dynamic object, wherein the obtaining or receiving is performed utilizing the query.

18. The computer program product of claim 17, wherein the instructions are further translatable by the processor for:

applying a filter to a result of the query, the applying producing a subset of the network addresses.

19. The computer program product of claim 15, wherein the dynamic object is one of a plurality of dynamic objects associated with the device-specific object of the network device.

20. The computer program product of claim 19, wherein a group object holds the plurality of dynamic objects, the group object representing a complete set of network addresses of the sources and the destinations of network traffic monitored by or under control of the network device.

\* \* \* \* \*